United States Patent
Burges et al.

(10) Patent No.: US 7,617,164 B2
(45) Date of Patent: Nov. 10, 2009

(54) EFFICIENCY OF TRAINING FOR RANKING SYSTEMS BASED ON PAIRWISE TRAINING WITH AGGREGATED GRADIENTS

(75) Inventors: Christopher J. Burges, Bellevue, WA (US); Robert J. Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 11/378,086

(22) Filed: Mar. 17, 2006

(65) Prior Publication Data

US 2007/0239632 A1    Oct. 11, 2007

(51) Int. Cl.
G06F 15/18 (2006.01)
G06G 7/00 (2006.01)
G06N 3/02 (2006.01)

(52) U.S. Cl. .............................. 706/15; 706/48; 707/5
(58) Field of Classification Search .................. 706/15, 706/48; 707/5
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,625,751 A * | 4/1997 | Brandwajn et al. ............ | 706/20 |
| 5,649,068 A | 7/1997 | Boser et al. | |
| 5,812,865 A | 9/1998 | Theimer et al. | |
| 6,260,013 B1 * | 7/2001 | Sejnoha ...................... | 704/240 |
| 6,466,232 B1 | 10/2002 | Newell et al. | |
| 6,513,046 B1 | 1/2003 | Abbott, III et al. | |
| 6,526,440 B1 | 2/2003 | Bharat | |
| 6,549,915 B2 | 4/2003 | Abbott, III et al. | |
| 6,636,860 B2 | 10/2003 | Vishnubhotla | |
| 6,691,106 B1 | 2/2004 | Sathyanarayan | |
| 6,747,675 B1 | 6/2004 | Abbott et al. | |
| 6,785,676 B2 | 8/2004 | Oblinger | |
| 6,791,580 B1 | 9/2004 | Abbott et al. | |
| 6,801,223 B1 | 10/2004 | Abbott et al. | |
| 6,812,937 B1 | 11/2004 | Abbott et al. | |

(Continued)

FOREIGN PATENT DOCUMENTS

WO            9800787            1/1998

OTHER PUBLICATIONS

Joachims, T. "Optimizing Search Engines using Clickthrough Data," ACM SIGKDD, 02, pp. 133-142.*

(Continued)

Primary Examiner—David R Vincent
Assistant Examiner—Li-Wu Chang
(74) Attorney, Agent, or Firm—Lee & Hayes, PLLC

(57) ABSTRACT

The subject disclosure pertains to systems and methods for facilitating training of machine learning systems utilizing pairwise training. The number of computations required during pairwise training is reduced by grouping the computations. First, a score is generated for each retrieved data item. During processing of the data item pairs, the scores of the data items in the pair are retrieved and used to generate a gradient for each data item. Once all of the pairs have been processed, the gradients for each data item are aggregated and the aggregated gradients are used to update the machine learning system.

17 Claims, 12 Drawing Sheets

U.S. PATENT DOCUMENTS

| | | | |
|---|---|---|---|
| 6,842,877 | B2 | 1/2005 | Robarts et al. |
| 6,873,990 | B2 | 3/2005 | Oblinger |
| 6,968,333 | B2 | 11/2005 | Abbott et al. |
| 7,249,058 | B2 | 7/2007 | Kim et al. |
| 7,281,002 | B2 | 10/2007 | Farrell |
| 7,305,381 | B1 | 12/2007 | Poppink et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0152190 | A1 | 10/2002 | Biebesheimer et al. |
| 2002/0188589 | A1 | 12/2002 | Salmenkaita et al. |
| 2003/0046401 | A1 | 3/2003 | Abbott et al. |
| 2003/0154476 | A1 | 8/2003 | Abbott, III et al. |
| 2003/0187844 | A1 | 10/2003 | Li et al. |
| 2003/0236662 | A1 | 12/2003 | Goodman |
| 2005/0034078 | A1 | 2/2005 | Abbott et al. |
| 2005/0049990 | A1* | 3/2005 | Milenova et al. ............ 706/48 |
| 2005/0125390 | A1 | 6/2005 | Hurst-Hiller et al. |
| 2005/0144158 | A1 | 6/2005 | Capper et al. |
| 2007/0043706 | A1 | 2/2007 | Burke et al. |
| 2007/0124297 | A1 | 5/2007 | Toebes |

OTHER PUBLICATIONS

Joachims "Optimizing Search Engines using Clickthrough Data", ACM SIGKDD, 2002, pp. 133-142.*
Erdogmus, et al. "Beyond second-order statistics for learning: A pairwise interaction model for entropy estimation", Natural Computing, vol. 1, Issue 1, 2002, pp. 85-108.*
Richardson, et al. "The Intelligent Surfer: Probabilistic Combination of Link andContent Information in PageRank", In Advances in Neural Information Processing Systems 14 (2002).*
Joachims "Evaluating Retrieval Performance using Clickthrough Data", Text Mining, 2003, pp. 79-96.*
Storn, et al., "Differential Evolution—A Simple and Efficient Heuristic for Global Optimization over Continuous Spaces", 1996.
Xia, et al., "A One-Layer Recurrent Neural Network for Support Vector Machine Learning", 2004.
Cohen, et al., "Volume Seedlings", 1992.
Storn, "On the Usage of Differential Evolution for Function Optimization", 2002.
Jarvelin, et al., Cumulated Gain-Based Evaluation of IR Techniques, 2002.
International Search Report and Written Opinion dated Mar. 6, 2008 for PCT Application Serial No. PCT/US06/26266, 11 Pages.
Storn, et al. "Differential Evolution—A Simple and Efficient Heuristic for Global Optimization over Continuous Spaces", 1996.
Storn. "On the Usage of Differential Evolution for Function Optimization", 2002.
Xia, et al. "A One-Layer Recurrent Neural Network for Support Vector Machine Learning", 2004.
U.S. Appl. No. 11/305;395, Burges, et al.
U.S. Appl. No. 11/066,514, Burges, et al.
G. S. Kimeldorf, et al., "Some results on Tchebycheffian Spline Functions" J. Mathematical Analysis and Applications, 1971, vol. 33, pp. 82-95.
C. Burges, et al, "Learning to Rank Using Gradient Descent", Proceedings of the 22nd international conference on Machine learning, ACM International Conference Proceeding Series; 2005, pp. 89-96, vol. 119, Bonn, Germany.
C. Burges, "Ranking as Learning Structured Outputs", in Proceedings of the NIPS 2005 Workshop on Learning to Rank, Dec. 2005, 4 pages.
B. Scholkopf, et al., "Learning with Kernels", MIT Press, 2002, pt. 1, 100 pages (front cover-80).
B. Scholkopf, et al., "Learning with Kernels", MIT Press, 2002, pt. 2, 100 pages (81-180).
B. Scholkopf, et al., "Learning with Kernels", MIT Press, 2002, pt. 3, 100 pages (181-280).
B. Scholkopf, et al., "Learning with Kernels", MIT Press, 2002, pt. 4, 100 pages (281-380).
B. Scholkopf, et al., "Learning with Kernels", MIT Press, 2002, pt. 5, 100 pages (381-480).
B. Scholkopf, et al., "Learning with Kernels", MIT Press, 2002, pt. 6, 100 pages (481-580).
B. Scholkopf, et al., "Learning with Kernels", MIT Press, 2002, pt. 7, 49 pages (581-back cover).
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38- No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on the Practical Application Of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Memory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminating Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

OA Dated Aug. 27, 2008 for U.S. Appl. No. 11/294,269, 10 pages.
OA Dated Sep. 17, 2008 for U.S. Appl. No. 11/294,269, 29 pages.
OA Dated Jul. 11, 2008 for U.S. Appl. No. 11066514, 29 pages.
OA Dated Oct. 31, 2008 for U.S. Appl. No. 11/426,981, 31 pages.
OA Dated Oct. 31, 2008 for U.S. Appl. No. 11/426,985, 30 pages.
OA Dated Jan. 15, 2009 for U.S. Appl. No. 11/294,269, 26 pages.
OA dated Dec. 9, 2008 for U.S. Appl. No. 11/066,514, 27 pages.

Freund, et al. "An Efficient Boosting Algorithm for Combining Preferences" (1999) 9 pages.

Bromley, et al. "Signature Verification Using 'Siamese' Time Delay Nural Network." (1993) Advances in Pattern Recognition Systems Using Neural Network Technologies, World Scientific, pp. 25-44.

Burges, C. "Simplified Support Vector Decision Rules" (1996) International Conference on Machine Learning, pp. 71-77.

Dekel, et al. "Log-linear Models for Label-ranking" (2004) NIPS, 8 pages.

Harrington, E. "Online ranking/collaborative filtering Using Perceptron Algorithm" (2003) ICNL, 8 pages.

Hastie, et al. "Classification by Pairwise Coupling" (1998) NIPS, pp. 451-471.

Jarvelin, et al. "IR Evaluation Methods for Retrieving Highly Relevant Documents" (2000) Proceedings of the 23rd annual ACM SIGIR, pp. 41-48.

Mason, et al. "Boosting Algorithms as Gradient Descent" (2000) NIPS 7 pages.

Caruana, et al. "Using the Future to 'Sort Out' the Present: Rankprop and Multitask Learning for Medical Risk Evaluation" (1996) NIPS, pp. 959-965.

Crammer, et al. "Pranking with Ranking" (2001) NIPS, 7 pages.

Baum, et al. "Supervised Learning of Probability Distributions by Neural Networks" (1988) Neural Information Processing Systems, pp. 52-61.

Orr, et al. "Neural Networks: Tricks of the Trade", Springer, 1998.

Refregier, et al. "Probabilistic Approach for Multiclass Classification with Neural Networks" (1991) Proceedings of the 1991 International Conference on Artificial Neural Networks (ICANN-91) 5 pages.

Herbrich, et al. "Large Margin Rank Boundaries for Ordinal Regression" (2000) Advances in Large Margin Classifiers, pp. 115-132.

Losee, Jr., "Minimizing Information Overload: The Ranking of Electronic Messages", Journal of Information Science 15 (3), 1989, 17 pgs.

Bradley, et al. "The Rank Analysis of Incomplete Block Designs 1: The Method of Paired Comparisons", Dec. 1952, Biometrika 39, pp. 324-245.

Mitchell, "Machine Learning, Book, Mar. 1997, New York: McGraw-Hill.

* cited by examiner

EFFICIENCY OF TRAINING FOR RANKING SYSTEMS BASED ON PAIRWISE TRAINING WITH AGGREGATED GRADIENTS

CROSS-REFERENCE TO RELATED APPLICATIONS

This application is related to co-pending U.S. application Ser. No. 11/066,514, entitled, "SYSTEM AND METHOD FOR LEARNING RANKING FUNCTIONS ON DATA", filed on Feb. 25, 2005 and co-pending U.S. patent application Ser. No. 11/305,395, entitled, "TRAINING A LEARNING SYSTEM WITH ARBITRARY COST FUNCTIONS", filed on Dec. 16, 2005, which is an application claiming benefit under 35 U.S.C. 119(e) of U.S. Provisional Patent Application Ser. No. 60/700,080, entitled, "TRAINING RANKING SYSTEMS WITH ARBITRARY COST FUNCTIONS", filed Jul. 18, 2005.

BACKGROUND

The amount of data available to information seekers has grown astronomically, whether as the result of the proliferation of information sources on the Internet, or as the result of private efforts to organize business information within a company, or as the result of a variety of other cases. As the amount of available data has grown, so has the need to be able to sort and locate relevant data. A related problem is the need to rank data that has been identified as relevant.

When users search data collections for specific data, they typically desire more than a listing of results that simply have some relation to the search query entered. Users generally want to be able to quickly locate the best or most relevant results from within the listing. Ranking the results of the search can facilitate locating the most relevant data. Generally, a high ranking should indicate that there is a high probability that the desired information is present in the search result.

One approach is to use machine learning systems to locate, sort, rank or otherwise process the data. Machine learning systems include such systems as neural networks, support vector machines ("SVMs") and perceptrons, among others. These systems can be used for a variety of data processing or analysis tasks, including, but not limited to, optical pattern and object recognition, control and feedback systems and text categorization. Other potential uses for machine learning systems include any application that can benefit from data classification or regression.

In general, machine learning systems go through a training phase to improve performance and generate optimal search, sort or ranking results. During a typical training phase, training data is input into a machine learning system and internal system parameters are adjusted based upon the output of the machine learning system and the desired results. The training phase continues until the machine learning system reaches an acceptable level of performance. Generally, increasing the size of the training data set improves system performance, but also increases the time required to train the machine learning system.

SUMMARY

The following presents a simplified summary of one or more embodiments of a system and/or method for training machine learning systems, in order to provide a basic understanding of some aspects of such embodiments. This summary is not an extensive overview, and is intended to neither identify key or critical elements of the embodiments nor delineate the scope of such embodiments. Its sole purpose is to present some concepts of the described embodiments in a simplified form as a prelude to the more detailed description that is presented later.

Briefly described, the systems and/or methods described herein facilitate the training of machine learning systems. The methods described herein reduce the number of computations required during pairwise training, thereby reducing the training phase of a machine learning system. In general, during pairwise training each labeled data item, pattern or document to be ranked is paired with another such labeled document, and multiple pairs of such documents are formed. Typically, in pairwise training each data item pair is independently evaluated. As each pair is processed, a score is generated for each data item in the pair and the machine learning system is updated for the pair. The systems and methods described herein group computations, such that the score for each data item is generated only once and the machine learning system is updated after all pairs for a query have been processed, rather than independently updating the machine learning system for each data item pair.

In one aspect of the system and methods described herein, the learning machine generates and stores a score for each data item prior to processing the data item pairs. In addition, internal parameters of the learning machine can be stored for each data item. During the processing of the data item pairs, the data item scores are retrieved rather than calculated separately for each pair. The scores are used to generate a gradient for each data item during the processing of the data item pair. The gradients for each data item are accumulated and after all of the pairs have been processed, the learning machine can be updated based upon the accumulated gradients and internal system parameters for each data item.

In another aspect of the system and methods described herein, the learning machine system generates and stores a score for each data item, but does not store all the learning machine system internal parameters. During processing of the pairs of data item, data item scores are retrieved and used to generate gradients for each data item in the data item pair. Prior to updating the learning machine system, internal parameters of the learning machine system can be obtained for each data item by computing the output for that item, using the learning machine system. The learning machine is then updated based upon the accumulated gradients and internal system parameters for each data item.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
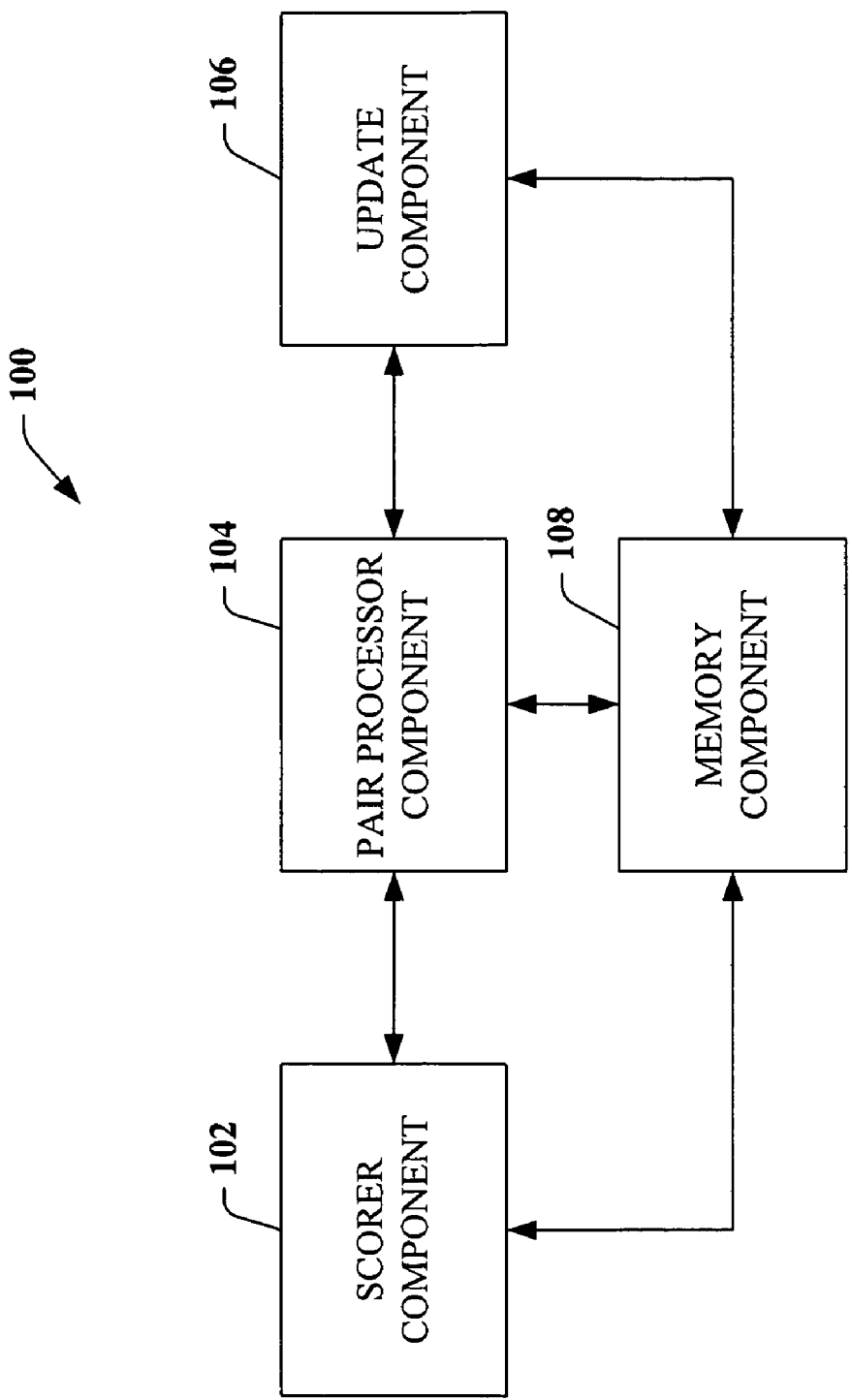
FIG. 1 is an illustration of a system for performing optimized pairwise training in accordance with an aspect of the subject matter disclosed herein.

The various aspects of the subject matter disclosed herein are now described with reference to the drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on computer and the computer can be a component. One or more components may reside within a process and/or thread of execution and a component may be localized on one computer and/or distributed between two or more computers. In addition, the word "exemplary" is used herein to mean serving as an example, instance or illustration. Any aspect or design described herein as "exemplary" is not necessarily to be construed as preferred or advantageous over other aspects or designs.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the disclosed subject matter may be implemented as a system, method, apparatus or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Frequently, machine learning systems are used to process data. For example, machine learning systems can be used to perform information retrieval or rank data items. Data items can include text files, web pages, image files, audio data, video data, word processing files and the like. The term machine learning system is generally intended to refer to a computer-related entity, either hardware, a combination of hardware and software, software, or software in execution. For the purposes of this disclosure, the terms machine learning system and learning system will be used interchangeably. Most often, learning systems are trained to process the data according to the needs of the users. A variety of metrics, such as cost functions, can be used to evaluate learning system performance.

One use for such machine learning systems is to rank elements in data sets. A specific example of a data set of interest is a set of web pages retrieved as a result of a search query formulated by a user. Within that data set, a user typically desires the web pages in the result to be ordered from the most likely to be responsive to his search request to the least likely. Web pages having the same likelihood of responsiveness (e.g., the same probability of a match with the query based upon certain criteria) should occur grouped together in the ranked list. (For presentation to the user, ordering of web pages with the same likelihood of responsiveness may be arbitrary or may be based upon any appropriate scheme.)

Another exemplary use for the described systems is answering questions. In question answering, a ranked set of answers (e.g., strings or phrases) is returned as a result of a search question formulated by a user. The first answer returned should be the answer most likely to be responsive to the question. The other members of the data set may be ignored completely or returned lower in the list. In this case, one example metric or cost function measures only if the top-returned answer is correct.

It is to be understood that machine learning systems can be utilized for a variety of uses beyond the ranking problem discussed in detail herein. It is also to be understood that an unlimited number of additional query options exist. In addition, it is to be understood that although query document examples are discussed in detail herein, the systems and methods described herein can be applied to any ranking problem. These alternative aspects are to be included within this scope of this disclosure and claims appended hereto. In other words, it is understood that the novel concepts and functionality described herein can be applied to an endless number of scenarios, each of which is to be included within spirit and scope of this disclosure and claims appended hereto.

Prior to use, machine learning systems are trained to optimize system output; this is the "learning" aspect. Sets of predefined training data can be input in the learning system. The output of the learning system generated using the training data can be evaluated and used to update the learning system.

Pairwise training is an example of an algorithm for training a learning system. In one example of pairwise training, the learning system is presented with a set of data items or documents retrieved from the training data based upon a query. It should be noted that throughout we will use the term 'document' as an example of the source of a feature vector, or data item, that is presented to the learning system (in fact, such a feature vector would be computed from both the document and the query, for the case of ranking documents given a query). Thus, as used herein, a "document" can include any type of data item and the terms "document" and "data item" can be used interchangeably. A query can be a text string or any other data used to search, sort or rank a document set. The learning system processes the retrieved documents in pairs (e.g., document A and document B), where one of the documents is desired to be ranked higher than the other document. Each document can be included in multiple pairs. When processing a document pair, the learning system generates a score for each document in the pair. A cost function is then used to evaluate the documents scores and generate gradients for the documents. The gradient gives both the direction and a local estimate of the amount that a document should move within the list of results. The parameters of the machine learning system are updated based upon the gradients for the document pair. For example, suppose that document A and document B are presented to the machine and it is desired that document A ranks higher than document B. If the machine outputs a lower number for document A than it does for document B, the cost function will output a large value. The gradients for document A and document B should indicate that document A should be moved up strongly in the list and document B should be moved downward strongly. The parameters or weights of the machine learning system are then updated accordingly. The machine learning system will then process the next document pair until all of the pairs have been processed.

A number of different cost functions or evaluation metrics can be used with pairwise training. One such metric is the mean reciprocal rank (MRR), which applies to the binary relevance task. MRR can be calculated as the average of the reciprocal of the rank of the highest ranking relevant document over the set of queries. Machine learning systems can also be evaluated using the normalized discounted cumulative gain measure ("NDCG"). NDCG, within the context of document retrieval, is a cumulative measure of ranking quality. Therefore, a suitable cost function would be one minus the NDGC. Additional metrics include pairwise error counts and winner-take-all ("WTA"). For pairwise error counts in the context of document retrieval, the number of document pairs that are in the incorrect order are counted. The WTA function is frequently used to evaluate question answering where only the top answer is evaluated. Often, in question answering, credit is given only if the correct answer is in the top position of a list of ranked answers. No credit is given if the wrong answer is in the top position, even if the correct answer is in the second position within the list of ranked answers.

The three measures discussed above, MRR, NDCG and WTA, are but a small, exemplary subset of the kinds of measures used by practitioners of retrieval and ranking methods. Additional metrics or cost functions include, but are not limited to, measurement of the area under a Receiver Operating Curve (ROC) and the mean average precision. This subset is used here for the purpose of clarifying the discussion with concrete examples. As such, these measures are not intended to limit the scope of the innovation in any way.

In general, learning systems have multiple phases of operation. The initial phase is known as the training phase. During the training phase, a set of training data can be input into the learning system. The learning system learns to optimize its output for data during the processing of the training data. Next, a set of validation data can be input into the learning system. The results of processing of the validation data set by the learning system can be measured using a variety of evaluation metrics to evaluate the performance of the learning system. The learning system can alternate between the training and validation data to optimize system performance. Once the learning system achieves a desired level of performance, the parameters of the learning system can be fixed such that performance will remain constant before the learning system enters into the operational phase. During the operational phase, which typically follows both training and validation, users can utilize the learning system to process operational data and obtain the users' desired results.

Typically, gradient-descent based learning systems utilizing pairwise training can compute the score for each document multiple times. Pairs should be selected that combine each document with every other document that does not have the same label. For example, for a set of ten documents to be ranked, the first five documents are labeled relevant and the remaining five documents are labeled irrelevant. In this example, document pairs should be selected, such that the first document is paired with each of the sixth, seventh, eighth, ninth and tenth documents. Similarly, the second, third, fourth and fifth documents should be paired with each of the sixth, seventh, eighth, ninth and tenth documents, resulting in twenty-five total document pairs. Typically, in pairwise training, the score for a document is computed separately for each document pair in which the document occurs. This is done for gradient-descent based learning systems, such as neural networks, because developers have found that in traditional neural network training, updating the network parameters after each data item is presented results in faster and more robust convergence. Since the learning system weights are changed after each data item, if the score for that data item is needed again (as will happen for pair-based training, if that data item occurs in multiple pairs) the score will have to be recomputed. This form of parameter updating is known in the art as 'stochastic gradient descent'. In this example, the score for the first document would be generated five separate times, once for each document pair that includes the first document. In total, the learning system will compute fifty document scores while processing the results of the query.

By reordering and grouping computations, the total number of computations required to perform pairwise training can be greatly reduced. Reducing the number of computations can result in reducing time and/or costs associated with training. Reduction in training times can allow operators to investigate more possible algorithms or add new features to a learning machine. In addition, since fewer computations are required for each document, a larger training data set can be used, possibly improving learning system results. The number of document score computations can be reduced by generating and storing the scores for all of the documents prior to processing document pairs, at the possible expense of not performing stochastic gradient descent. In the example discussed above, the learning system would generate ten document scores when processing the query as opposed to twenty-five document scores. The document scores for a pair of documents can then be retrieved and used in the pair-based computations to determine a gradient for each document. After all of the document pairs are processed, the gradients for each document can be aggregated and used to update the parameters of the learning system. Alternatively, the gradients can be accumulated during the pair processing and the accumulated gradients for each document can be used to update the learning system.

FIG. 1 is an illustration of a system 100 for performing optimized pairwise training as disclosed herein. The system 100 includes a scorer component 102, a pair processor component 104, an update component 106 and a memory component 108. Scorer component 102 receives a set of documents to be ranked. For example, the set of documents can be retrieved from a data store based at least in part upon an input query. The scorer component 102 generates a score for each document in the set of received documents and stores the scores in the memory component 108. Pairs of the documents are selected and processed by the pair processor component 104, which generates gradients for each document. Document gradients are based upon pairs of document scores retrieved from the memory component 108 and a cost function. Document gradients can be maintained in the memory component 108 as arrays of gradient values for each document, including a gradient value for every document pair in which the document occurs. Alternatively, an aggregated gradient for each document can be maintained and adjusted for each additional gradient value. After all of the document pairs have been processed, the update component 106 can retrieve the document gradients from the memory component 108, aggregate the gradients, if necessary, and update the parameters of the learning system for each document based at least in part on the document gradients.

Figure 2:
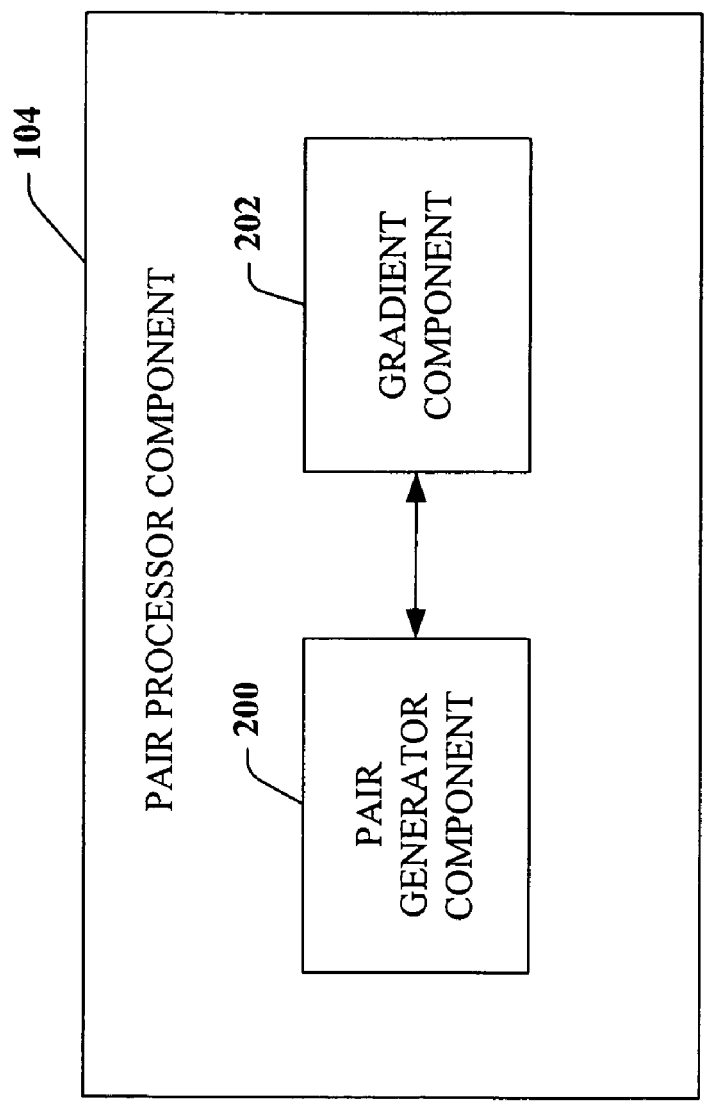
FIG. 2 is an illustration of a system for performing optimized pairwise training in accordance with an aspect of the subject matter disclosed herein.

FIG. 2 is an illustration of a pair processor component 104 of a system for performing pairwise training. The pair processor component can include a pair generator component 200 and a gradient component 202. The pair processor component 104 can generate or select pairs of documents, such that each document is paired with every other document that has a distinct label. The gradient component generates a gradient for each document in a pair of documents 204.

Figure 3:
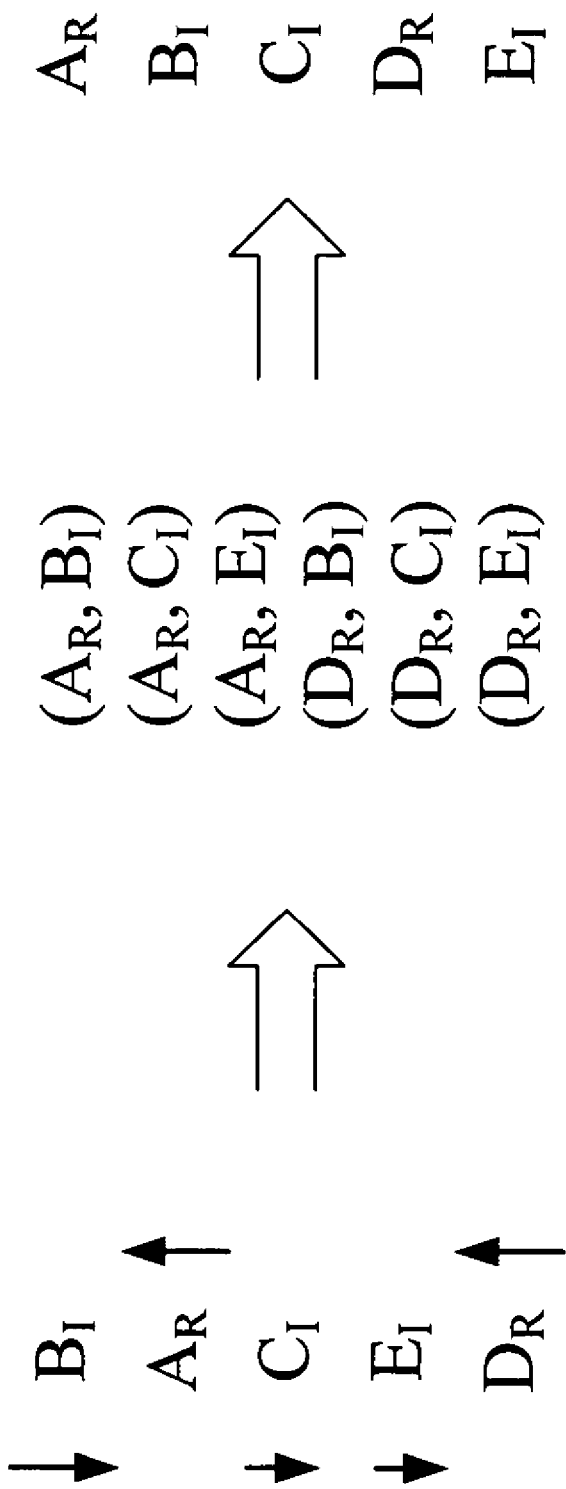
FIG. 3 is an illustration of pairwise training using an exemplary set of documents, for a given query.

Referring now to FIGS. 1-3, FIG. 3 illustrates pairwise training using an exemplary set of ranked results and the systems shown in FIGS. 1 and 2. The column on the left of FIG. 3 represents a set of five documents A, B, C, D and E retrieved using a search query. These documents can be provided to the scorer component 102 for training. Here, the documents are ranked from top to bottom in the FIG. 3. The subscript for each document indicates the document label, where 'R' indicates the document is relevant and 'I' indicates the document is irrelevant. Labels generally indicate the quality of the ranking. Here, a binary label system (e.g., relevant and irrelevant) is illustrated. However, any number of levels of labels could be used. For example, label levels could include "Excellent," "Good," "Satisfactory" and "Poor." As illustrated, documents A and D are relevant and the remaining documents are irrelevant. Assuming that a pairwise cost function is used, the direction of the arrow next to each document in the figure indicates the direction that each document should move to reduce the cost and thereby improve the ranked results. The size of the arrow is indicative of how strongly the document should move in the indicated direction. Consequently, in an optimal ranking the top two positions in the ranking would be occupied by documents A and D, followed by the remaining documents.

The middle column of FIG. 3 illustrates a set of document pairs that can be generated based upon the retrieved documents. The pairs of documents can be selected or generated by the pair generator component 200. Each document is paired with every other document that has a different label. Here, every relevant document A and D should be paired with each of the irrelevant documents, B, C and E. As a result, the number of possible pairs increases rapidly as additional documents are returned. For example, the return of one additional relevant document F would result in three new pairs ($F_R$, $B_I$), ($F_R$, $C_I$) and ($F_R$, $E_I$).

Document scores for a pair can be retrieved from the memory component 108 and evaluated by gradient component 202 to generate a gradient for each document in the pair. The direction and amount each document should be moved is reflected in the gradient. Generally, the gradient can be generated using the derivative of the cost function or an approximation thereof. In one instantiation, the cost function is a function of the difference of the scores of the two documents in the pair, in which case the increments to the gradients computed for those two documents will be equal and opposite. Once the gradients for the document pairs have been determined, the parameters of the learning machine can be updated by the update component 106.

The rightmost column of FIG. 3 illustrates an exemplary order of the documents after the learning system is updated. Based upon the gradients, documents A and D have been moved up the ordered list of documents and documents B and E have been moved down the ordered list of documents. As additional pairs are processed, the order will continue to change, converging toward the desired order.

Figure 4:
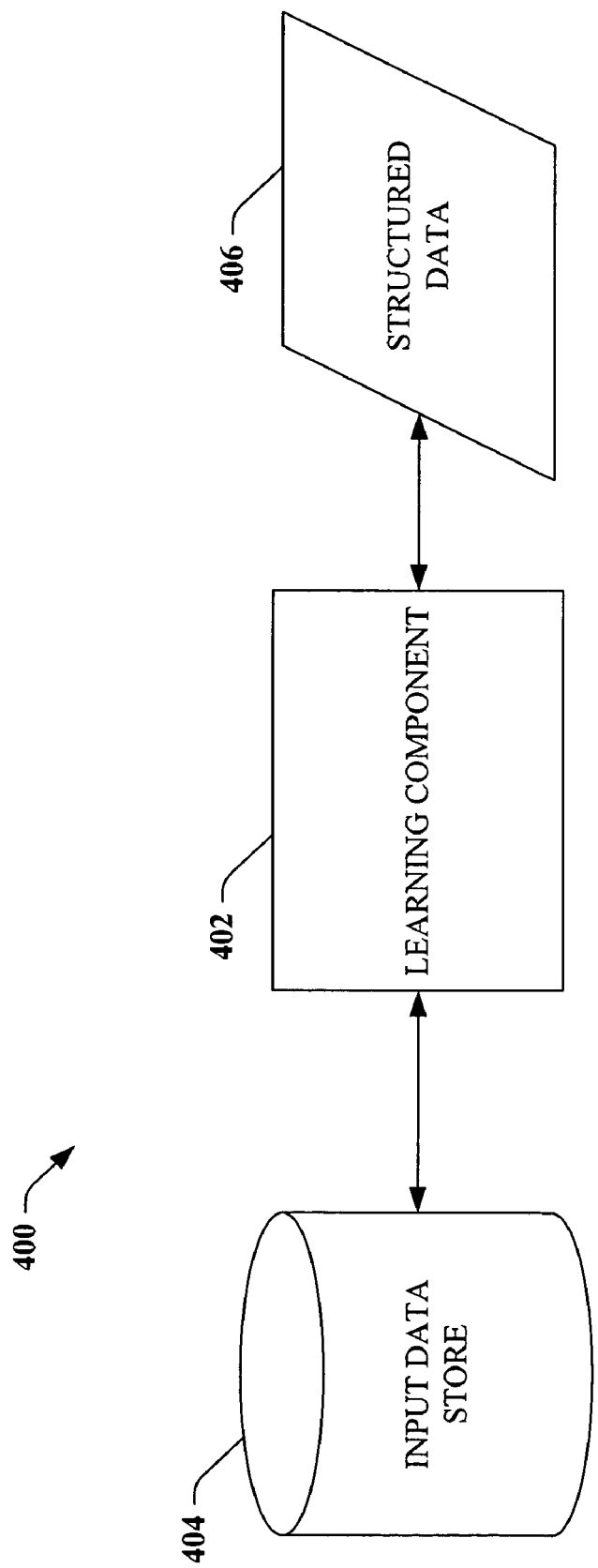
FIG. 4 is an illustration of a system for generating structured data in accordance with an aspect of the subject matter disclosed herein.

FIG. 4 is an illustration of a system 400 for generating structured data in accordance with an aspect of the subject matter disclosed herein. The system can be implemented using a machine learning system. As used herein, structured data can include ordered data, partially ordered data, graphs, sequences, strings, or the like. The system 400 can be used for ranking and/or sorting data or for information retrieval, but is not limited to such uses. The system 400 includes a learning component 402, an input data store 404 and a set of structured data 406. The learning component 402 can include any machine learning system that can be trained using gradient descent. The examples presented as part of this disclosure generally illustrate learning systems using neural networks to implement the learning component 402. However, artisans of ordinary skill in this area will recognize that other machine learning systems, including but not limited to, kernel learning method systems, Bayesian methods, and boosting methods can be utilized in connection with the subject matter disclosed herein. Such artisans will also readily recognize that modifications may be made to specific examples presented in order to substitute other machine learning systems in place of a neural network. Although modifications of this type may be made, those modifications are simply implementation details and do not depart from the scope of the disclosed subject matter.

The input data store 404 contains data to be input into and processed by the learning component 402. A data store as used herein is any collection of data including, but not limited too, a database or collection of files, including text files, web pages, image files, audio data, video data, word processing files and the like. Data within the input data store 404 can be formatted in any manner suitable for use by the learning component 402. Alternatively, the system 400 can include a formatting component (not shown) that renders the data in a format suitable for operation on by the learning component 402. In addition, the format of the data within the input data store 404 may vary based upon a mode or phase of operation of the learning component 402, such as a training phase, a validation phase or an operational phase.

The learning component 402 can process the data from the input data store 404 and output a set of structured data 406. The structured data 406 can be used by other components or presented to a user, or both. For example, the system can include a viewing component, not shown, which displays the structured data to users in any format useful to or desired by the users. An example of such structured data 406 would include the result of a search for documents on a network as a response to a user's query (e.g., web pages on the Internet). A set of responsive documents may be presented to the learning component 402 as input data and ranked in an order based upon certain criteria before being presented to the user as structured data 406 or in this example ranked search results.

A machine learning system for generating structured data 406 can be implemented using a neural network. Neural networks are commonly used for classification and regression tasks. A neural network is commonly organized as a multi-layered, hierarchical arrangement of processing elements, also referred to as neurons, nodes or units. For the purposes of this disclosure, the terms neuron, node and unit will be used interchangeably. Each unit typically has one or more inputs and one output. Each input is typically weighted by some coefficient value. Each output of a unit is typically a result of processing its input value(s) in accordance with an activation function and any weight or bias applied.

In a hierarchical arrangement of neurons in a neural network, the neurons are usually arranged into layers. The output of a neuron in one layer can be an input to one or more neurons in a successive layer. Layers may be exposed in the sense that either the inputs of neurons in that layer directly receive input from a data source external to the neural network or the outputs of neurons are the desired result of processing. Layers may also be hidden in the sense that the inputs of units in that layer are computed using the outputs of units in a previous or lower layer, and the outputs of units in a hidden layer feed inputs for units in a successive or higher layer. An exemplary neural network can include any suitable number of layers such as an input layer, an intermediate or hidden layer and an output layer.

The use of a neural network typically involves a training phase and a testing phase. During the training phase, one of a preselected group of data patterns called the "training set" is presented to the network for classification. This process is often referred to as forward propagation. One purpose of the training step is to minimize the cost function, thereby minimizing errors in the network. Results from the training are then used to adjust parameters of the network, such as weights or biases, in such a way that, if that pattern were presented for forward propagation again, the network would yield a lower cost. This adjustment process is referred to as backward propagation. Forward propagation and backward propagation are usually performed successively until the cost function, averaged over a suitable, second preselected group of data patterns called a "validation set", is minimized. Such a procedure, where the network parameters are updated after each pattern is shown, is called stochastic gradient descent.

When training is completed, the parameters of the network are frozen and can no longer be changed. At that point, the network is said to be fully trained. A test data set is presented to the network and the results of computation on that test set are evaluated and compared with a known ideal result. If that evaluation yields a result that is within an acceptable margin, the network is accepted for use.

Figure 5:
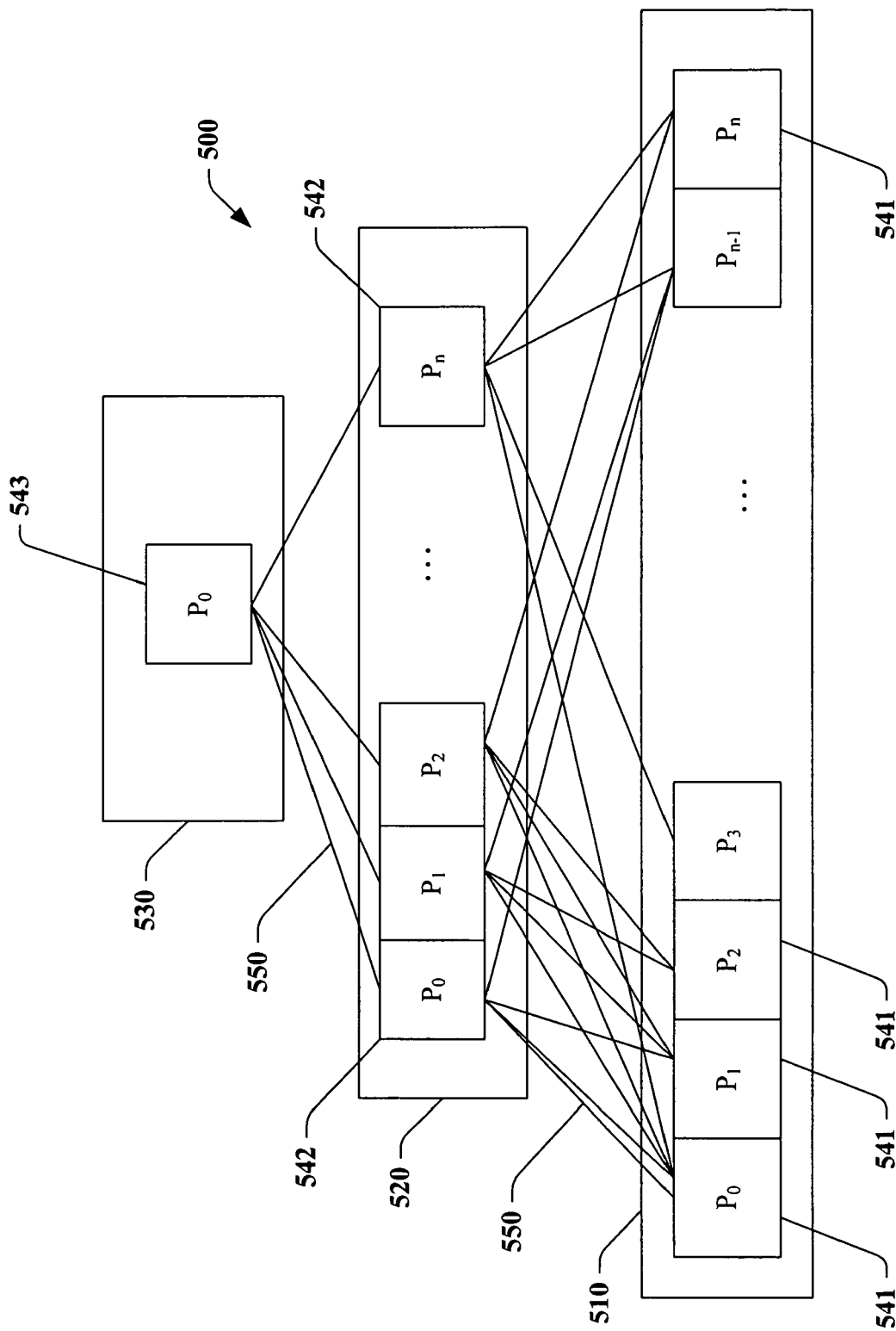
FIG. 5 is a system block diagram of a multi-layer neural network.

FIG. 5 is a system block diagram of a multi-layer neural network 500 that can be used to implement the learning component 402. The neural network 500 depicted includes an input layer 510, a hidden layer 520 and an output layer 530. Each layer includes one or more neurons 541, 542, 543 that each accept an input; process that input with respect to some predefined function and optional weight or bias; and provide an output. The units in each layer are connected to each other through a number of connections 550. In the example depicted, each layer is fully connected with adjacent layer(s), meaning that each unit in that layer is connected to every unit in the layer(s) adjacent to the layer in which that unit resides. For presentation clarity, some units and some connections have been omitted from the figure. It should be appreciated that the exact number and configuration of units in the neural network is an implementation detail within the level of skill of the ordinary artisan in this area and that the specific configuration depicted in FIG. 5 and discussed herein should not be taken as a limiting factor.

The input layer 510 is the layer that initially receives input data to be ranked. Typically, the input data is structured such that a number of attributes of interest are defined and each attribute has an associated value. A common, and in many cases preferred, configuration of the input layer 510 is for that layer to have a number of units equal to the number of attributes of interest of the data to be processed. Each unit 541 in the input layer 510 will then process a single attribute of the input data and feed the results of its processing forward to the units 542 of the hidden layer 520. Typically, the units in the input layer do not have associated biases or weights, whereas every other unit in the network does. Similarly, the units 542 of the hidden layer 520 will process data input to them from the units 541 of the input layer 510 and feed results of their processing forward to the units 543 of the output layer 530. The units 543 of the output layer 530 similarly process their respective input data and output results.

In the case of a learning system ranking query search results, attributes or feature vectors may be derived from both the query and a search result (e.g. a document). Each feature vector may be a set of numbers dependent upon certain attributes, for example, the words in the query, the titles of the results, the number of occurrences of certain words in the results and any other features of the query or the results. A feature vector is the result of a single query document pair.

Figure 6:
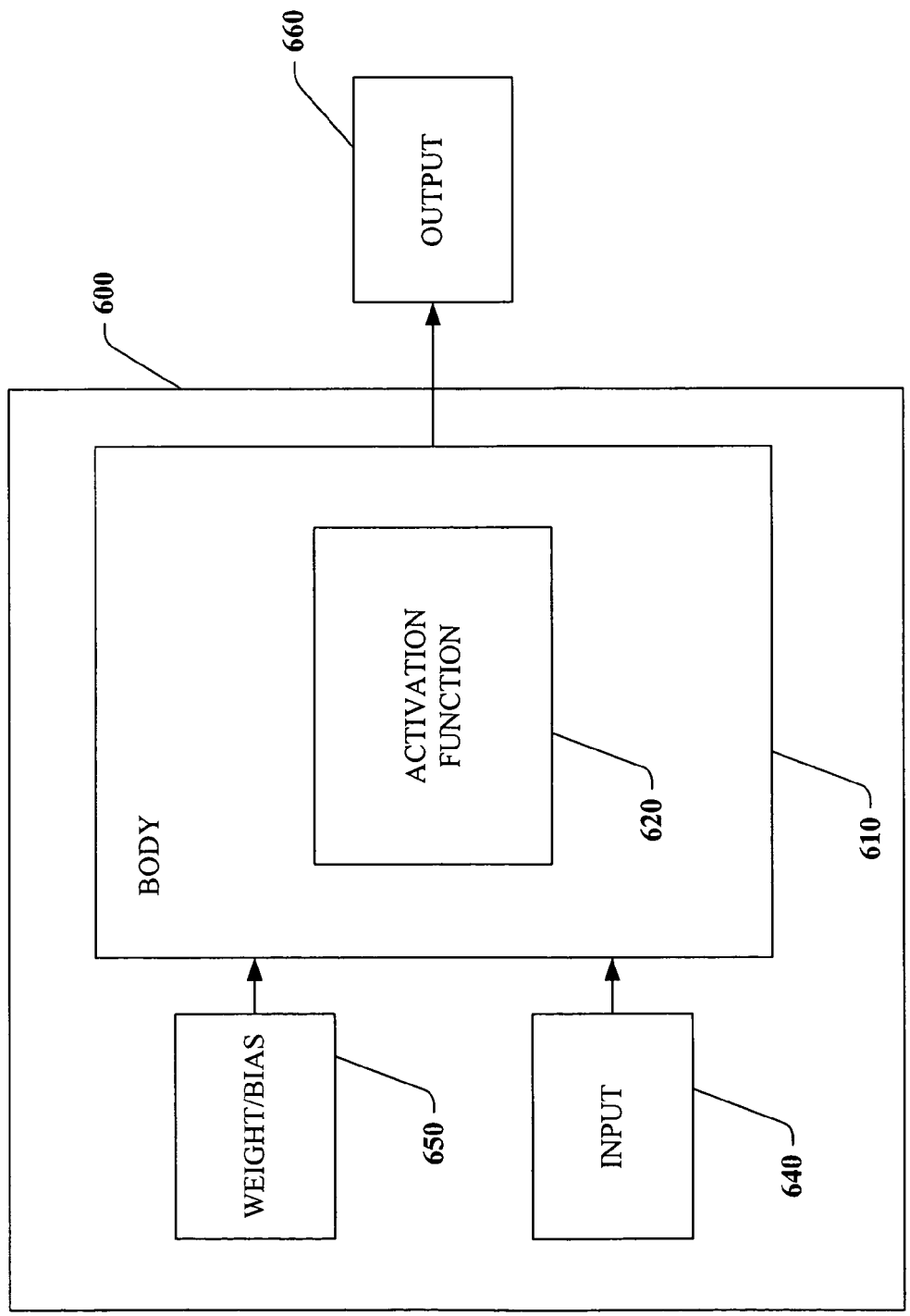
FIG. 6 is a system block diagram of a unit of a neural network.

Turning now to FIG. 6, a sample neuron or unit 600 is depicted in system block diagram form. The unit 600 includes a body 610 that performs data processing in accordance with a predefined process. Usually that process is in the form of an activation function 620. Specific activation functions that may be employed are largely a matter of implementation choice but are typically some form of sigmoidal function.

An input 640 feeds data into the body 610 for processing in accordance with its predefined functions. A weight or bias 650, also referred to as the parameter, is also depicted as an input into the body 610 of the unit 600, although other weighting or biasing means may be used, such as a variable within the body 610 of the unit 600. An output 660 is the result of passing the summed inputs and bias through the activation function.

As mentioned, specific activation functions employed are largely a matter of implementation choice in any given application. It is possible for each and every unit in a neural network to have a unique activation function. However, it is typical for units within the input and hidden layers to have the same activation function and to use different functions for the output layer. Again, whether to use different functions is primarily an implementation choice.

To construct and configure a neural network of the type discussed, a number of factors are considered. Appropriate activation functions are created or selected. Input data formats are defined. The number of units and layers is determined, along with interconnection topologies for those units and layers. When construction is completed, the network is trained and tested.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flowcharts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier or media.

Figure 7:
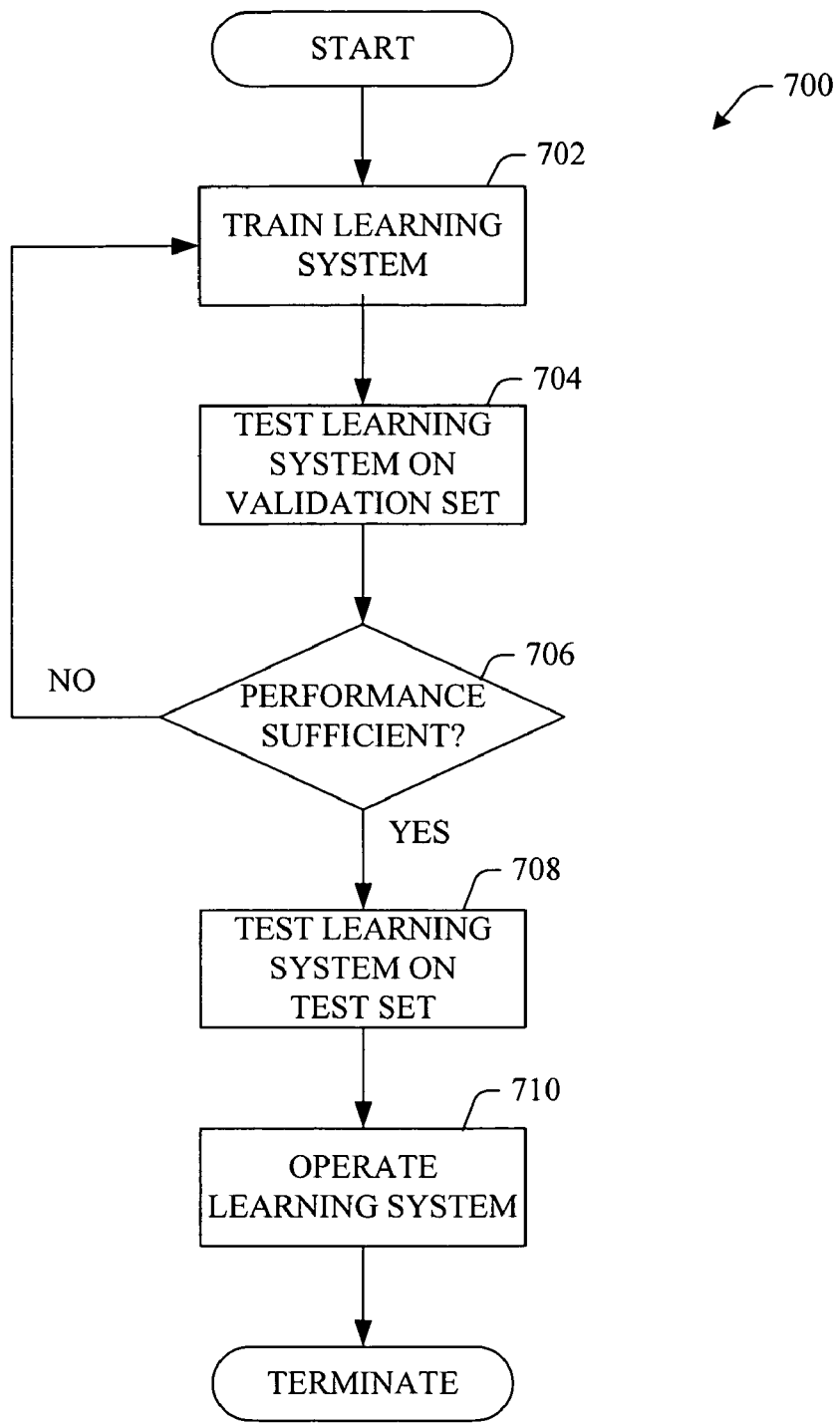
FIG. 7 is an illustration of a method of preparing a learning system for operation in accordance with an aspect of the subject matter disclosed herein.

FIG. 7 illustrates a method 700 for preparing a learning system for operation. At 702, the learning system is trained. At 704, the learning system is tested using validation data. At 706, a determination is made as to whether the performance of the learning system over the validation data is sufficient. If the performance is insufficient, the learning system continues training at 702. If the performance of the learning system is sufficient, processing continues at 708, where the system is tested on a test data set. After the learning system is tested on test data, the learning system enters the operational phase and can be utilized by users at 710. The operating parameters of the learning system can be fixed prior to entering into the operational phase.

Figure 8:
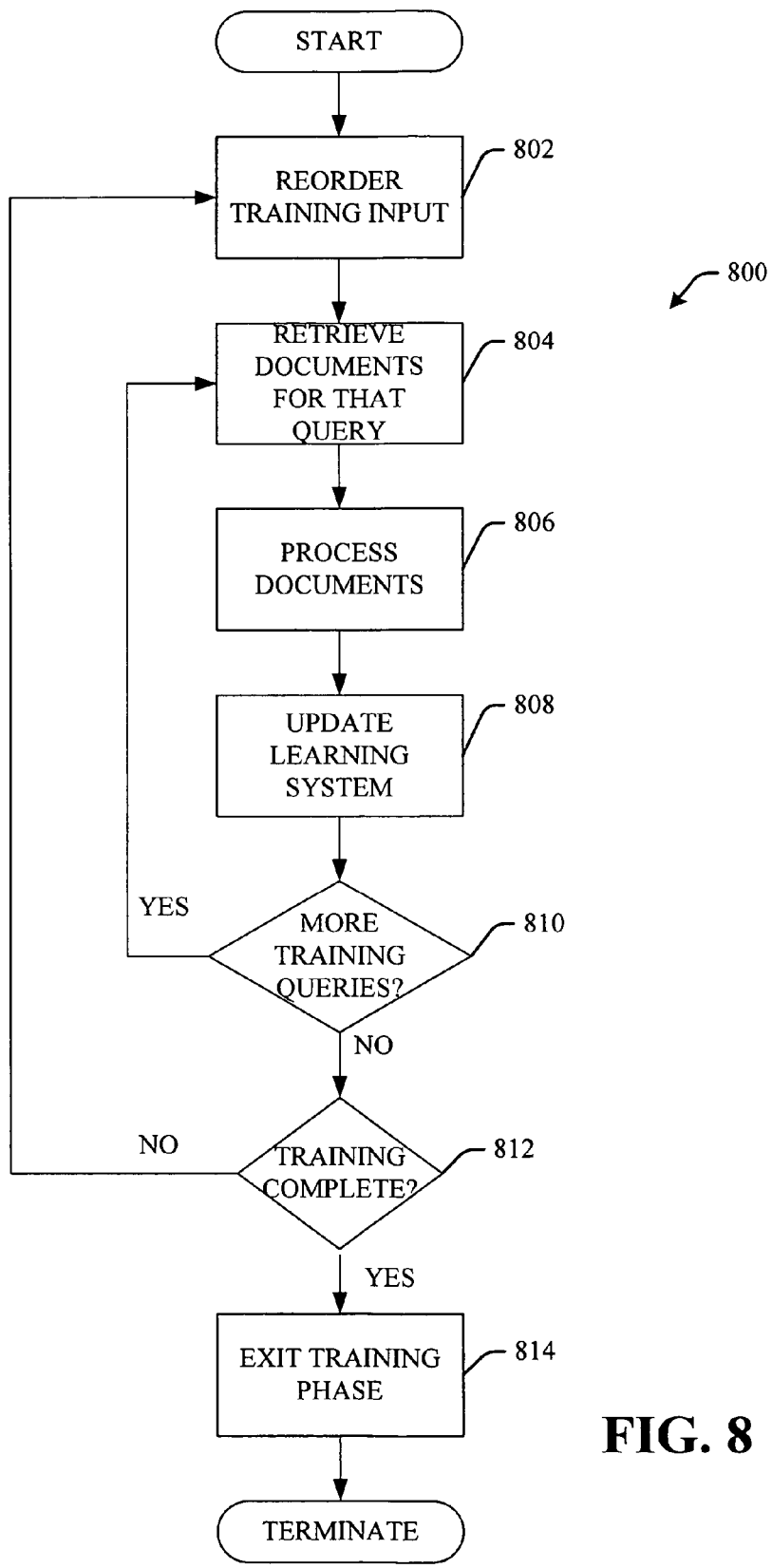
FIG. 8 is an illustration of a method of training a learning system in accordance with an aspect of the subject matter disclosed herein.

FIG. 8 illustrates a method 800 for training a learning system. The method is described with respect to a ranking system utilizing a neural network. However, as previously stated, the method is not limited to document query ranking problems or systems utilizing neural networks. At 802 the training input is reordered. In particular, the set of queries that make up the training set are shuffled. Shuffling refers to a procedure during which queries within the set are reordered before being presented to a neural network. It is often useful to shuffle queries in this fashion prior to beginning a training epoch because such shuffling can assist in convergence. At 804, the query is used to retrieve a set of documents. The set of documents are processed or ranked at 806. In this example, for a given query, a set of query document pairs is presented to the learning system. Alternatively, a set of feature vectors can be presented to the learning system. Each feature vector can be computed (for a given query) from the query/document pair (that is, some features will depend, in general, on both the query and the document). The set of query document pairs includes each document to be ranked, for that given query. The set is also augmented with either an idea ranking or an ideal output for each query/document pair. At 808, the learning system is updated based upon the results of processing each document retrieved by the query. At 810, a determination is made as to whether there are additional queries in the training set to process. If yes, the process returns to 804 and retrieves documents using the next query. If no, at 812 a determination is made as to whether training of the learning system is complete. The determination can be based upon the results of the learning system and various metrics. If training of the learning system is complete, the learning system exits the training phase at 814. The parameters of the learning system can be fixed such that performance will remain constant before the learning system enters into the operational phase. If no, the training input is reordered and training continues at 802.

Figure 9:
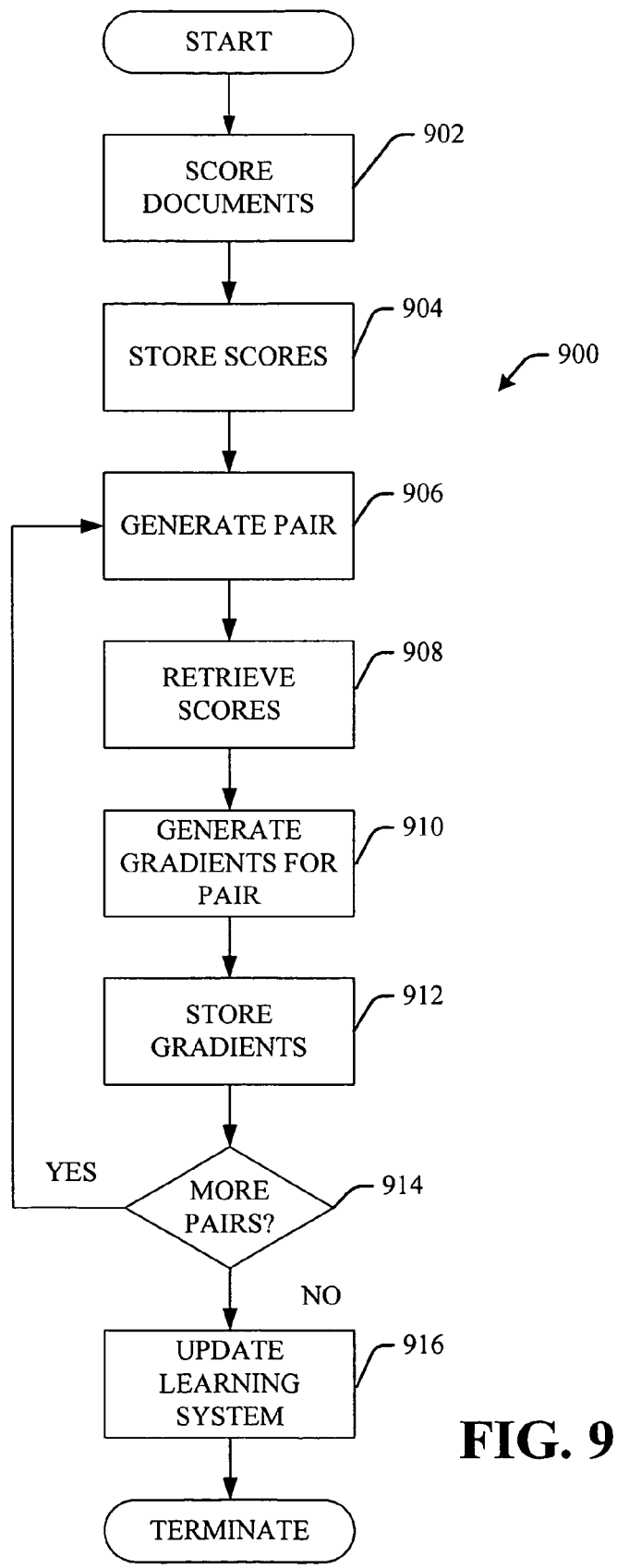
FIG. 9 is an illustration of a method of updating a learning system in accordance with an aspect of the subject matter disclosed herein.

Referring now to FIG. 9, a method of processing the documents for training a learning system is illustrated. At 902, a score is generated for each document to be ranked, such as a set of documents retrieved in response to a query. For example, in a neural network a score for the document query pair can be generated using forward propagation. At 904, scores for the all the documents can be stored for retrieval at a later time. In addition, internal parameters of the learning system can be stored for later use in updating the learning system. In a neural network, the internal parameters including the weights or biases and the activation of each node of the neural network can be determined during forward propagation and stored at the same time the document score is stored. At 906, a document pair can be generated. Document pairs should be selected such that documents within a pair have distinct labels and each document should be paired with every document that has a different label. All of the document pairs can be generated at one time or, alternatively, each pair can be selected separate such that after one pair is processed the next pair of documents is selected until all possible document pairs have been processed.

Once a document pair is selected, the scores for the documents in the pair are retrieved at 908. At 910, a gradient is generated for each document in the document pair based upon the retrieved score of each document and a cost function. Typically, gradients can be generated using the derivative of the cost function. The gradients for each document in the pair can be stored at 912. Arrays of gradient values for each document can be maintained, where an array contains the gradient values for each document pair in which a document occurs. Alternatively, a single, aggregated gradient value can be maintained for each document by adding the gradient value generated for each document pair to the stored aggregated gradient value. At 914, a determination is made as to whether there are additional document pairs to process. If yes, the process returns to 906 and the next pair of documents is selected. If no, at 916 the learning system is updated based upon the aggregated gradients for each document. For example, in a neural network the internal parameters can be retrieved and used along with the gradients to update the learning system for each document during backward propagation.

The method illustrated in FIG. 9 groups the computations required to update the learning system and processes a batch of updates at one time for a given query. However, the learning system is updated individually for each query. The updated learning system can then used to generate document scores and process the next query. Consequently, the learning system converges rapidly to optimize performance. The procedure of updating the neural network weights once for each pass through all the training data is known as 'batch training'. Here, a version of batch training can be performed for each query, but stochastic gradient descent is performed from one query to the next. In this way, the convergence properties of stochastic gradient descent can be maintained, while the batch-per-query training allows a reordering of the code that can result in a significant efficiency improvement. It should be noted however that the proposed method, when updating for a given query, does differ from traditional batch training. In traditional batch training, the updates to the parameters of the neural network are computed, by forward propagating and backward propagating each pattern. These updates to the parameters are accumulated over the whole training set, and the parameters themselves are updated at the end of each pass through the whole training set. In the proposed method, however, only the gradients are stored (or, in a second, faster implementation that requires more memory, the gradients and the internal activations of the stored): that is, for a given query, the gradients for each document are accumulated in a store.

This results in the requirement that only one forward and backward propagation is needed for each document for a given query, whereas in traditional batch update, this would be done for both documents in each pair. It should be noted that for traditional batch update, it would not be possible here to simply compute the required change in parameters for each document, and multiply by the number of times that document appears in a pair, since each pair can generate a different update to the parameters (since the cost function depends on the pair of documents). Thus relying on accumulating the gradients allows us to significantly reduce the computational load that using traditional batch training would require.

Using the methodology illustrated in FIG. 9, the score for a particular document is generated only once, rather than being generated for each pair in which the document occurs. This novel reduction in score computations can result in a significant reduction of processing time, particularly in neural networks. Furthermore, the backward propagation need only be done once per document, using the accumulated gradients and the stored node activations in the neural network. In a neural network, the forward propagation computations necessary to generate scores and internal network values and the backward propagation phase require much more time than the computations necessary to generate gradients. Consequently, reducing the total number of forward and backward propagations can have a substantial impact on the total time required for the training phase. In fact, although the number of gradients to be computed is still approximately quadratic in the number of documents, the gradient computations are so fast (for example, gradient computations can be performed using lookup tables) that the overall training becomes linear in the number of documents, rather than quadratic.

Figure 10:
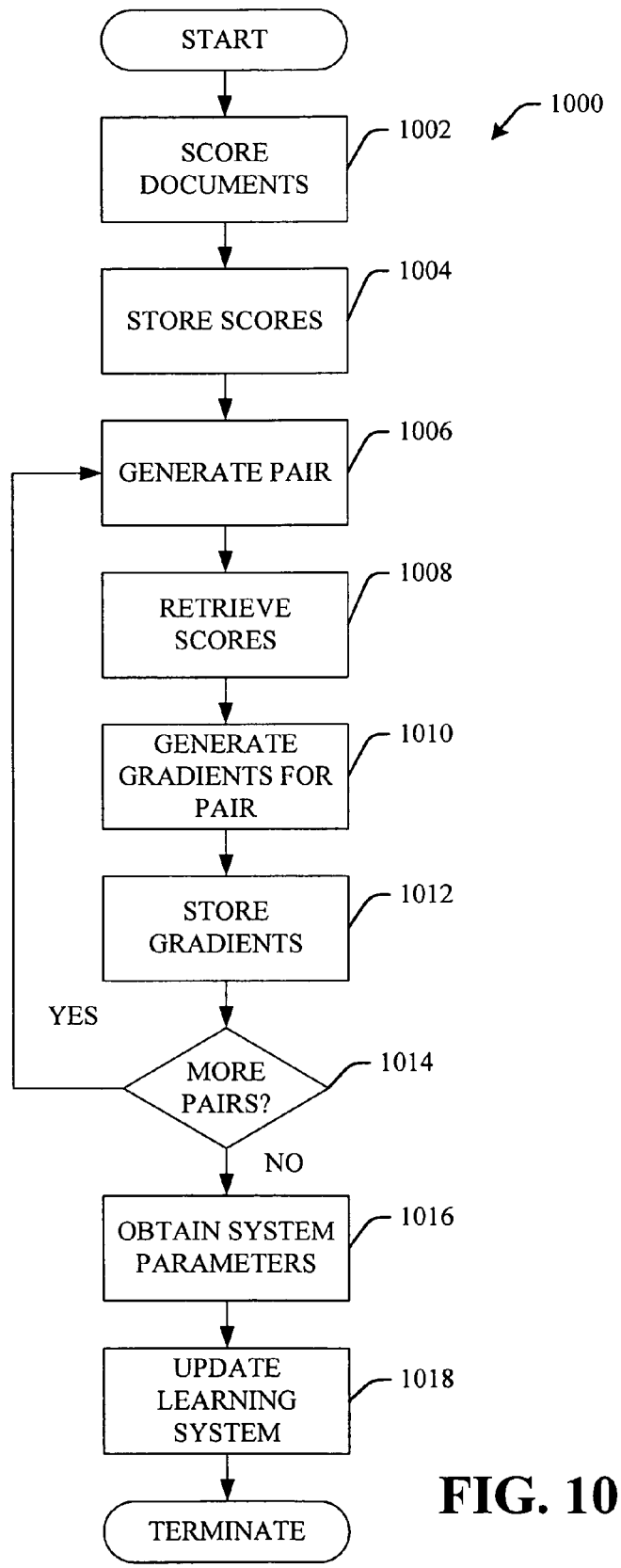
FIG. 10 is an illustration of a method of updating a learning system in accordance with an aspect of the subject matter disclosed herein.

Referring now to FIG. 10, a method of processing the documents to train the learning system is illustrated. At 1002, a score is generated for each document retrieved in response to a query. For a neural network, the score can be generated using forward propagation. At 1004, document scores can be stored for retrieval at a later time. However, storing the internal parameters may require excessive memory and here, the internal parameters of the learning system are not stored. At 1006, a document pair containing documents with distinct labels can be selected. Alternatively, a set of document pairs can be generated, such that each document is paired with every other document that has a distinct label.

Once a document pair is selected, the scores for the documents in the pair are retrieved at 1008. At 1010, a gradient is generated for each document in a document pair based upon the retrieved score of each document and a cost function. The gradients for each document in the pair can be stored at 1012. Arrays of gradient values for each document can be maintained, where an array contains the gradient values for a document for each document pair in which the document occurs. Alternatively, a single, aggregated gradient value can be maintained for each document by adding the gradient value generated for each document pair to the stored aggregated gradient value. At 1014, a determination is made as to whether there are additional document pairs to process. If yes, the process returns to 1008 and retrieves the document scores for the next pair of documents. If no, at 1016 the learning system obtains the internal values or parameters necessary for each document to update the system. For example, in a neural network, a second forward propagation can be performed for each document to compute the activation of each node in the network for the document. At 1018, the learning system is updated based upon the aggregated gradients and the neural network weights and the computed activations for each document. In an aspect, the aggregated gradient can be generated by summing the gradients of the document for every document pair in which the document appears. For a neural network, a backward propagation is performed for each document using the aggregated gradients and the internal parameters of the network for the document.

Using the method illustrated in FIG. 10, a computation is performed to generate a score for each document and a separate computation is performed for each document to obtain the node activations of the neural network. In a neural network, both computations require a forward propagation. Although, the number of computations is greater than the number required in the methodology illustrated in FIG. 10, the total number of forward propagations is still limited to twice the number of documents. This limited number of computations is still likely to be significantly less (in fact it is linear in the number of documents) than the computations required to generate a document's score for every pair in which the document occurs (which is approximately quadratic in the number of documents). In addition, generating the node activations at the time of the learning system update rather then storing and retrieving them significantly reduces the amount of memory required.

Figure 11:
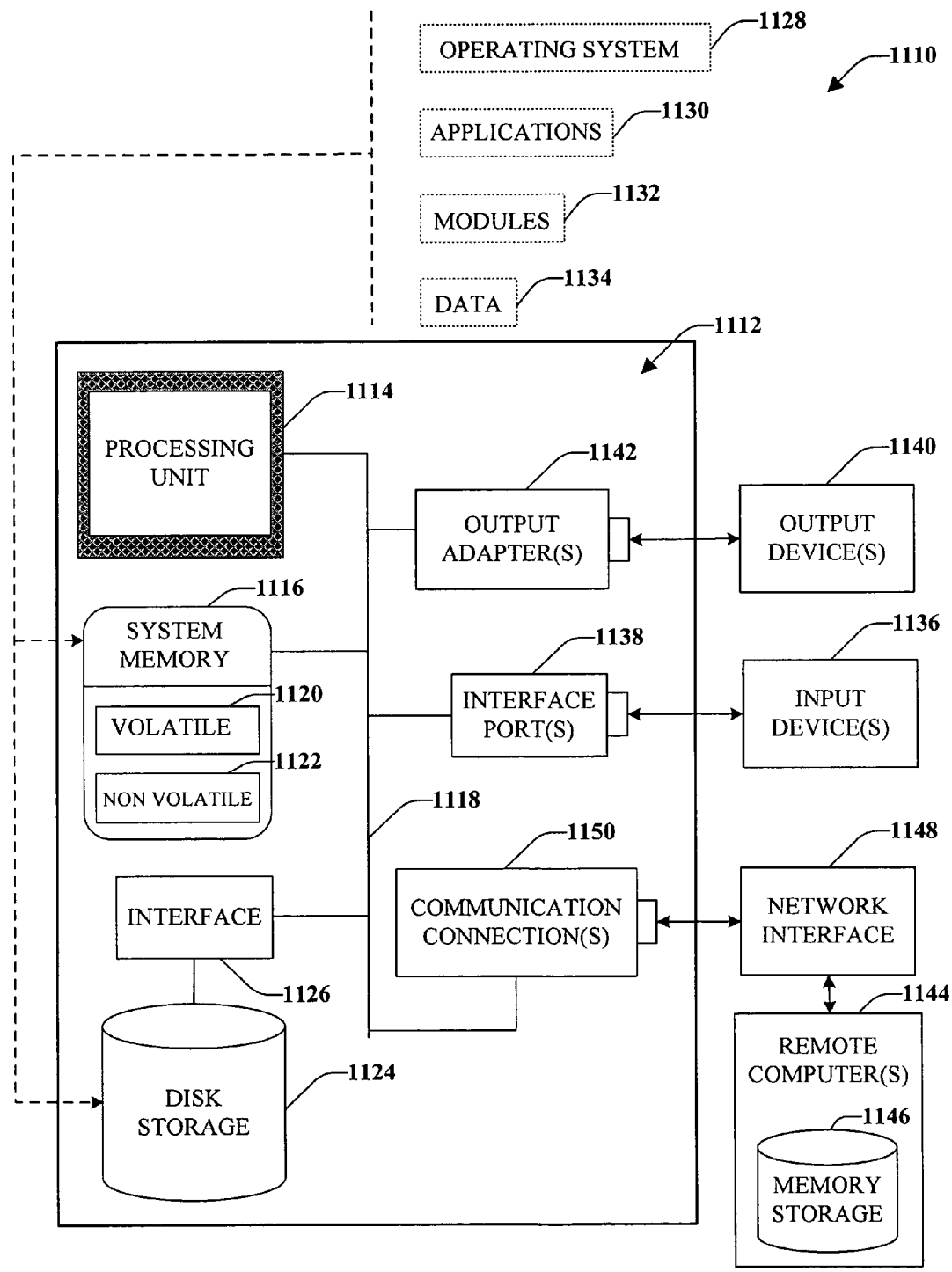
FIG. 11 is a schematic block diagram illustrating a suitable operating environment.
Figure 12:
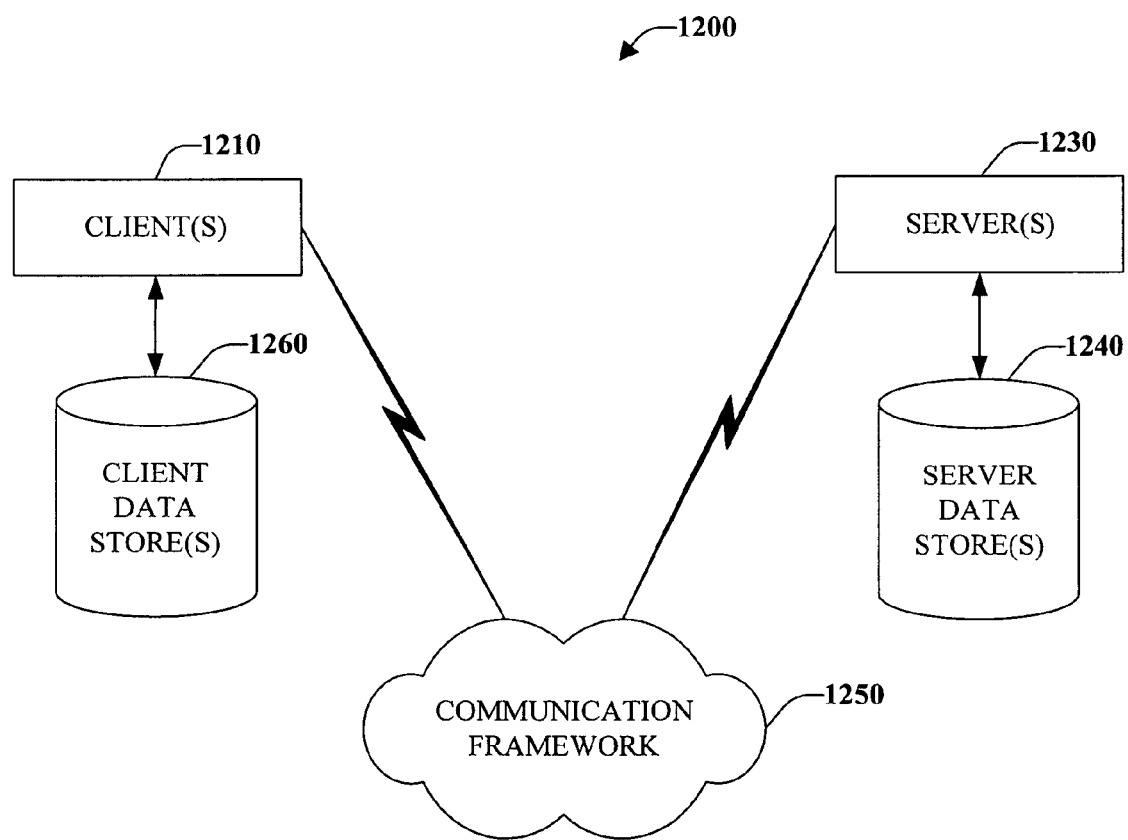
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed system and methods also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 10-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present system and methods can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection(s) 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the disclosed system can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. One or more computer-readable media storing computer-executable instructions that, when executed on one or more processors, cause the one or more processors to perform acts comprising:

generating a score for each of a plurality of data items during a forward propagation process, the score generated for each data item prior to a pairwise training process that compares a pair of data items having different labels, wherein the score for each of the data items is generated only once;

comparing the data items as data item pairs for each unique combination of data items with different labels during the pairwise training process using the scores generated from the forward propagation process;

generating an aggregate gradient for the data items from the scores of the pairs of data items based on the comparing the data items, the aggregate gradient being representative of gradients calculated for each data item that results from the unique combination of the data item pairs, wherein the aggregate gradient provides a direction and a local estimate of the amount that a document should move within a ranking of the data items during a training of a learning machine; and updating weights used by a learning machine after generating the aggregate gradient for each of the data items using a backward propagation process.

2. The one or more computer-readable media method of claim 1, wherein updating weights used by a learning machine reduces a cost function of the learning machine when ranking the data items.

3. The one or more computer-readable media method of claim 2, wherein the weights are used to update parameters of a network such that a subsequent forward propagation process yields a revised cost that is less than a cost from the forward propagation.

4. The one or more computer-readable media of claim 2, wherein the acts further comprise obtaining internal parameters of the learning machine for each of the data items, the internal parameters are utilized to update the learning machine.

5. The one or more computer-readable media of claim 4, wherein the acts farther comprise maintaining the internal parameters for each of the data items; and retrieving the maintained internal parameters.

6. The one or more computer-readable media of claim 1, wherein the data items includes at least one of a text file, a web page, an image, audio data, video data and a word processing file.

7. The one or more computer-readable media of claim 1, wherein the learning machine is a neural network.

8. The one or more computer-readable media of claim 1, wherein the acts further comprise:

obtaining internal parameters of the neural network during the forward propagation for score generation;

maintaining the internal parameters; and utilizing the internal parameters during the backward propagation.

9. The one or more computer-readable media of claim 1, wherein updating the learning machine further comprises:

performing a second forward propagation to obtain internal parameters of the neural network; and utilizing the internal parameters in the backward propagation.

10. A system for facilitating training of a learning machine utilizing a pairwise algorithm, comprising:

one or more processors; and memory to store computer readable instructions executable by the processor, the memory used to store:

a scorer component that generates a score for each of a plurality of data items during a forward propagation process, the score generated for each data item prior to a pairwise training process that compares a pair of data items having different labels, wherein the score for each of the data items is generated only once;

a comparing component that compares the data items as data item pairs for each unique combination of data items with different labels during the pairwise training process using the scores generated from the forward propagation process;

a pair processor component that generates an aggregate gradient for the data items from the scores of the pairs of data items based on the comparing the data items, the aggregate gradient being representative of gradients calculated for each data item that results from the unique combination of the data item pairs, wherein the aggregate gradient provides a direction and a local estimate of the amount that a document should move within a ranking of the data items during the training of the learning machine; and an update component that updates weights used by a learning machine after generating the gradient for each of the data items using a backward propagation process.

11. The system of claim 10, wherein the memory component maintains an aggregated gradient for each of the data items and the update component obtains the aggregated gradient for each of the data items.

12. The system of claim 10, wherein the memory is to further store a parameter component for obtaining internal parameters of the learning machine for each of the data items, wherein the update component updates the learning machine based at least in part upon the internal parameters.

13. The system of claim 10, wherein the learning system is a neural network.

14. The system of claim 11, wherein the aggregate gradient is representative of the gradients calculated for each data item that results from the unique combination of the data item pairs.

15. The system of claim 14, wherein the scorer component obtains internal parameters of the neural network during forward propagation, the memory component maintains the internal parameters and the update component utilizes the internal parameters during the backward propagation.

16. The system of claim 14, wherein the memory is to further store a parameter component that performs a second forward propagation to obtain internal parameters of the neural network during update, and the update component utilizes the internal parameters during backward propagation.

17. The system of claim 14, wherein the aggregate gradient provides a direction and a local estimate of the amount that a document should move within a ranking of the data items during a training of a learning machine.

* * * * *